L. M. COOPER.
STEERING WHEEL.
APPLICATION FILED NOV. 8, 1915.

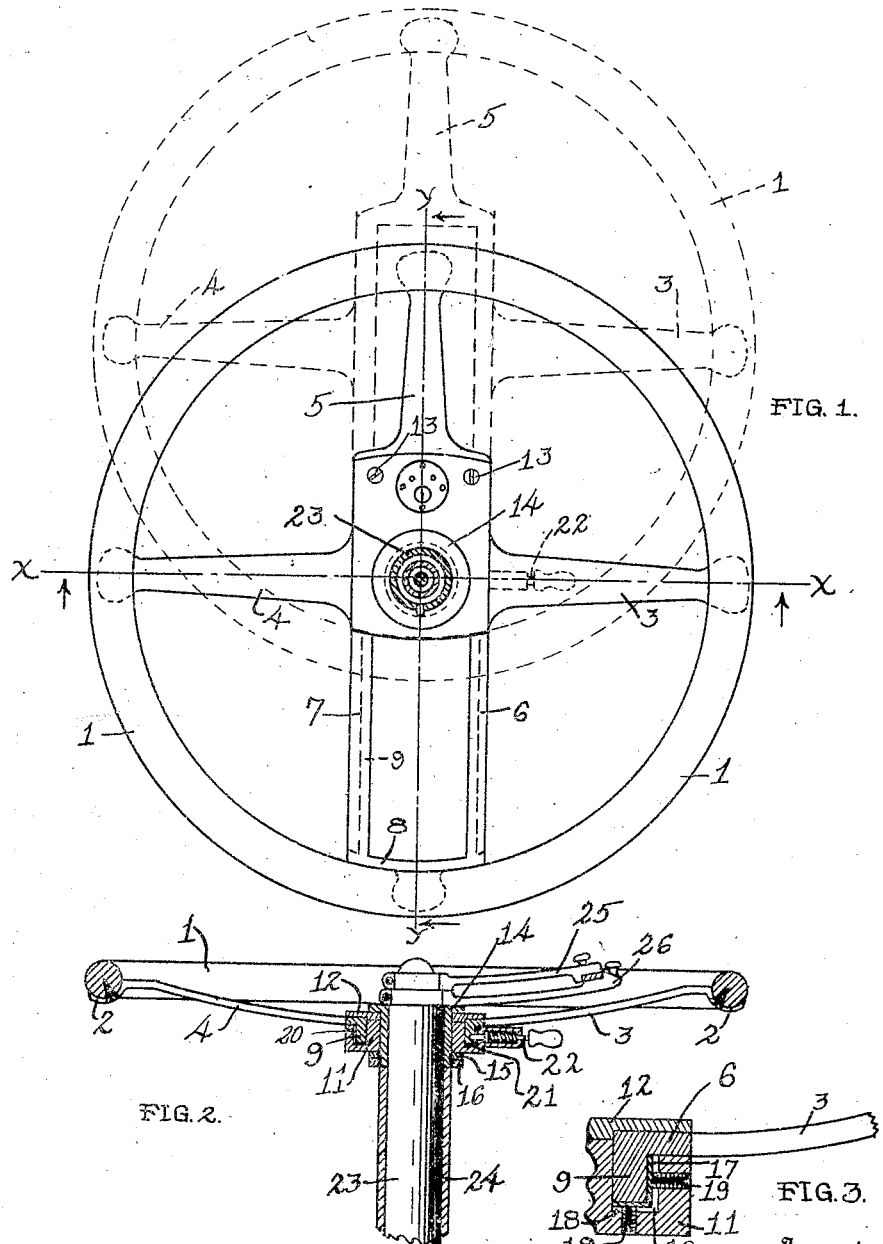

1,236,148.

Patented Aug. 7, 1917.
2 SHEETS—SHEET 2.

Inventor
LYMAN M. COOPER.

Witness
Emma B. Wiener.

By Charles T. Wiener
Attorney

UNITED STATES PATENT OFFICE.

LYMAN M. COOPER, OF DETROIT, MICHIGAN, ASSIGNOR OF ONE-HALF TO THOMAS J. CLINTON, OF DETROIT, MICHIGAN.

STEERING-WHEEL.

1,236,148.  Specification of Letters Patent.  Patented Aug. 7, 1917.

Application filed November 8, 1915. Serial No. 60,173.

*To all whom it may concern:*

Be it known that I, LYMAN M. COOPER, a citizen of the United States, residing at Detroit, county of Wayne, State of Michigan, have invented a certain new and useful Improvement in Steering-Wheels, and declare the following to be a full, clear, and exact description of the same, such as will enable others skilled in the art to which it pertains to make and use the same, reference being had to the accompanying drawings, which form a part of this specification.

This invention relates to steering wheels for automobiles and its object is a cheap and efficient wheel for the purpose adapted to slide relative to the steering shaft to provide greater room for the driver in getting into and out of the vehicle. With the usual steering wheel fixedly held centrally to the steering shaft, the space between the rim of the wheel and the driver's seat is such that it is sometimes difficult, especially if a person be of large size, to get into and out of the seat beneath the wheel. By the arrangement herein described the wheel may be moved upward away from the seat providing greater space between the lower edge of the wheel and the seat so that the driver may get into and out of the seat without the necessity of having to crowd in beneath the wheel rim. The wheel is provided with releasable means for securing it in operative or inoperative position for the purpose above stated.

A further object of the invention is a steering wheel that may be locked to or unlocked from the steering shaft to prevent use of the car by unauthorized persons, and an additional object of the invention is a steering wheel involving the locking and sliding features in a single structure. The preferred form of construction by means of which these and several other objects of the invention may be attained is shown in the accompanying drawing in which—

Figure 1 is a plan view of a steering wheel embodying my invention.

Fig. 2 is a section taken on line *x—x* of Fig. 1.

Fig. 3 is an enlarged detail of the structural arrangement of the sliding parts.

Similar characters refer to similar parts throughout the drawing and specification.

Figure 5:
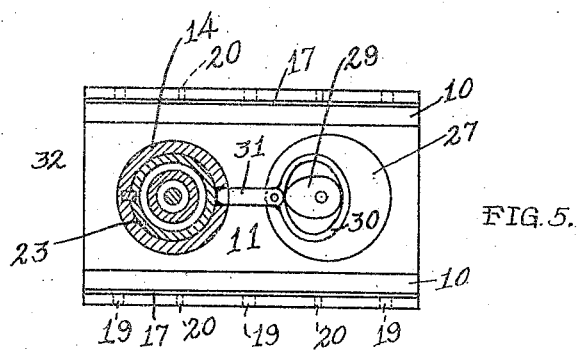
Fig. 5 is an enlarged plan view showing the locking device in locked position.
Figure 6:
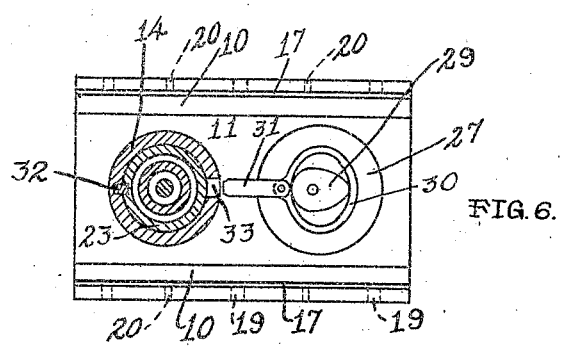
Fig. 6 is a similar view showing the device in unlocked position in which the wheel may freely rotate about the steering shaft.

As is shown in Fig. 1, the rim 1 of the wheel, which is preferably of wood, is secured to the ends of the spider, the said ends being formed to embrace the lower side of the rim as indicated at 2 in Fig. 2. The wheel rim, however, may be secured to the spider in any approved manner. The spider consists of the two opposite single arms 3 and 4 and the single arm 5 opposite to which is a slotted arm having the two side members 6 and 7 united by a cross-bar 8 at the extreme end and secured to the rim in a manner similar to that of the arms 3, 4 and 5. The members 6 and 7 of the slotted arm have a depending flange portion 9, as indicated in Figs. 2 and 3, which ride in grooves 10 formed in each side of the head 11. These portions 6 and 7, after the flanges have been inserted in the corresponding grooves, are held in place therein by a cover plate 12 as indicated in said Figs. 2 and 3. This cover plate is held in place by the screws 13, and a bushing 14. The bushing is flanged on the upper surface as indicated in Fig. 2, and threaded at the lower end thereof provided with a nut 15 and locknut 16 to secure the bushing and cover plate in place. The portions 6 and 7 of the slotted arm and depending flanges 9 thereon ride comparatively freely in the grooves in the head 11 and plate 12, and gibs 17 and 18 are provided in each groove to take up wear, the said gibs being held in place by several screws 19, in each instance, located in threaded apertures in the head, as shown particularly in Fig. 3. As shown in Figs. 5 and 6 there are several screws 19 for each gib and the gibs are also provided with one or more pins 20 engaging in apertures in the head to prevent movement of the gib endwise in the slot by movement of the flanges 9 therein. As indicated at 21 in Fig. 2, one of the flanges 9 is apertured to receive the end of the spring pressed plunger 22 carried in a boss on the head which holds the spider in its set position relative to the central steering shaft 23, there being two such apertures 21 in one of which the pin engages when the wheel is centrally positioned relative to the shaft as indicated by full lines in Fig. 1, and in the other of which when out of such position as indicated by dotted lines in said figure. The wheel is thus detachably secured in either operative or inoperative position.

The steering shaft 23 may be of any well known form now in use, usually inclosed by an outer tubular incasing 24 and on the upper end of the shaft, preferably above the head 11, are the throttle and spark control levers 25 and 26. By the described arrangement of parts the wheel may be readily shifted relative to the shaft as indicated by dotted lines in Fig. 1 allowing freedom of movement of the driver in entering or leaving the driver's seat adjacent the wheel.

Figure 4:
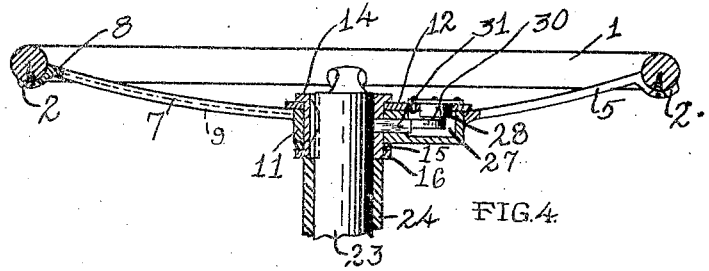
Fig. 4 is a section taken on line *y—y* of Fig. 1, showing the lock.

As indicated in Figs. 4, 5 and 6, the head 11 is recessed at 27 into which the barrel of the lock 28 extends. The flange of the barrel is secured to the cover plate preferably by being riveted thereto as indicated in Fig. 4 and at the lower end of the barrel is a cam shaped member 29, indicated in Figs. 5 and 6, which engages in a ring shaped member 30 that is pivotally secured to the bolt 31. The bolt rides in a slot provided between the recess 27 and the aperture in the head, in which the bushing 14 is secured. As indicated in Figs. 5 and 6 the bushing is secured to the steering shaft 23 by a key 32 so that the bushing and shaft 23 may move as a unit. The bushing 14, as indicated in Fig. 6, is provided with an aperture 33 adapted to be engaged by the bolt 31 when moved by the lock as is shown in Fig. 5, and when the bolt is withdrawn from the slot 33 the head 11 may turn freely on the ferrule 14. Thus, to lock the device to prevent use of the car by unauthorized persons, the bolt 30 is withdrawn whereupon the steering wheel is no longer effective to rotate the steering shaft, and by turning the lock so that the bolt again engages the slot in the ferrule the head is secured in fixed relation with the steering shaft and rotation of the wheel will turn the shaft as is desired. By pivotally connecting the ring 30 with the bolt the cam member 29 on the end of the lock barrel does not tend to bind the bolt 31 in the slot in which it rides, as the said ring is free to move from side to side during rotation of the cam member 29 to effect movement of the bolt.

From the foregoing description it becomes evident that the wheel is of simple construction requiring but little machine work and that of a comparatively inexpensive nature, and that by releasing the spring pressed plunger 22 the wheel may be freely moved relative to the central shaft, and that by the use of gibs as stated, all wear may be taken up and looseness of parts avoided. Furthermore by the use of the bushing keyed to the steering shaft and secured to the head relative to which the wheel is adapted to be moved by the provision of the lock as described, a simple and efficient device is provided to prevent unauthorized use of the car. The lock may be of any approved type by means of which the bolt may be operated but is preferably of the barrel type here shown having a cam rotated by use of a key to operate the bolt 31.

Having thus briefly described my invention and its utility, what I claim and desire to secure by Letters Patent of the United States is—

1. The combination with a shaft, of a head thereon having parallel grooves on opposite sides of the shaft, a steering wheel having corresponding flanges adapted to ride in the grooves, a cover plate for said head for maintaining the flanges in the grooves, and gibs supported by the head adapted to hold the flanges comparatively tightly in the grooves and prevent looseness between the head and the wheel.

2. The combination with a shaft, of a head thereon having parallel grooves in the upper surface on opposite sides of the shaft, a steering wheel having a spider provided with corresponding flanges adapted to ride in the grooves, a cover plate for said head adapted to maintain the flanges in the grooves, and releasable means for preventing movement of the spider relative to the head.

3. The combination with a shaft, of a steering head adapted to be releasably secured to the shaft and provided with parallel grooves on opposite sides of the shaft open on the upper side of the head, a steering wheel having corresponding depending flanges adapted to ride in the grooves, means for maintaining the flanges in the grooves in a freely movable relation therewith, means for taking up wear and preventing free lateral movement of the wheel, and releasable means for securing the wheel in position relative to the head.

In testimony whereof, I sign this specification.

LYMAN M. COOPER.